United States Patent
Scognamiglio

(10) Patent No.: US 10,422,421 B2
(45) Date of Patent: Sep. 24, 2019

(54) PLANETARY GEAR SYSTEM AND GAS TURBINE ENGINE WITH A PLANETARY GEAR SYSTEM

(71) Applicant: Rolls-Royce Deutschland Ltd & Co KG, Blankenfelde-Mahlow (DE)

(72) Inventor: Domenico Scognamiglio, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 25 days.

(21) Appl. No.: 15/880,301

(22) Filed: Jan. 25, 2018

(65) Prior Publication Data
US 2018/0216724 A1   Aug. 2, 2018

(30) Foreign Application Priority Data
Jan. 30, 2017 (EP) ..................................... 17153747

(51) Int. Cl.
*F16H 57/08* (2006.01)
*F02C 7/36* (2006.01)

(52) U.S. Cl.
CPC ............ *F16H 57/082* (2013.01); *F02C 7/36* (2013.01); *F05D 2260/40311* (2013.01); *Y02T 50/671* (2013.01)

(58) Field of Classification Search
CPC . F16H 57/082; F05D 2260/40311; F02C 7/36
See application file for complete search history.

(56) References Cited

U.S. PATENT DOCUMENTS

| | | | |
|---|---|---|---|
| 6,422,291 B1 | 7/2002 | Katou et al. | |
| 6,422,971 B1 | 7/2002 | Katou et al. | |
| 9,784,364 B2 * | 10/2017 | Hattori | F16H 57/082 |
| 2004/0242365 A1 * | 12/2004 | Uebbing | F16H 37/0833 475/214 |
| 2016/0177841 A1 | 6/2016 | Blaney et al. | |

FOREIGN PATENT DOCUMENTS

| | | |
|---|---|---|
| DE | 10049564 A1 | 4/2001 |
| EP | 2360391 A1 | 8/2011 |
| GB | 2446265 A | 8/2008 |
| WO | WO2004067998 A1 | 8/2004 |

OTHER PUBLICATIONS

European Search Report dated Jul. 18, 2017 for counterpart European patent Application No. 17153747.5, (7 pages).

* cited by examiner

*Primary Examiner* — Mark J Beauchaine
(74) *Attorney, Agent, or Firm* — Shuttleworth & Ingersoll, PLC; Timothy J. Klima

(57) ABSTRACT

A planetary gear system for a gas turbine engine with a plurality of planetary gears coupled to a carrier device, with front planetary gears mounted on pins in a front row and aft planetary gears mounted on pins in an aft row, the two rows being parallel to each other in the axial direction of the planetary gear system. The carrier device includes a ring-like base structure around a rotational axis of the carrier device, the pins are coupled to of the carrier device through first and second extension elements for the positioning of the pins relative to the base structure. The second extension elements axially extending the respective pins further away from the base structure than the pins positioned by the first extension elements.

18 Claims, 7 Drawing Sheets

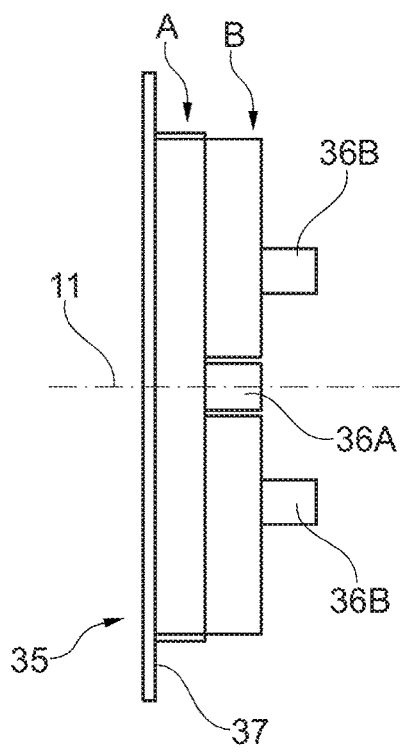
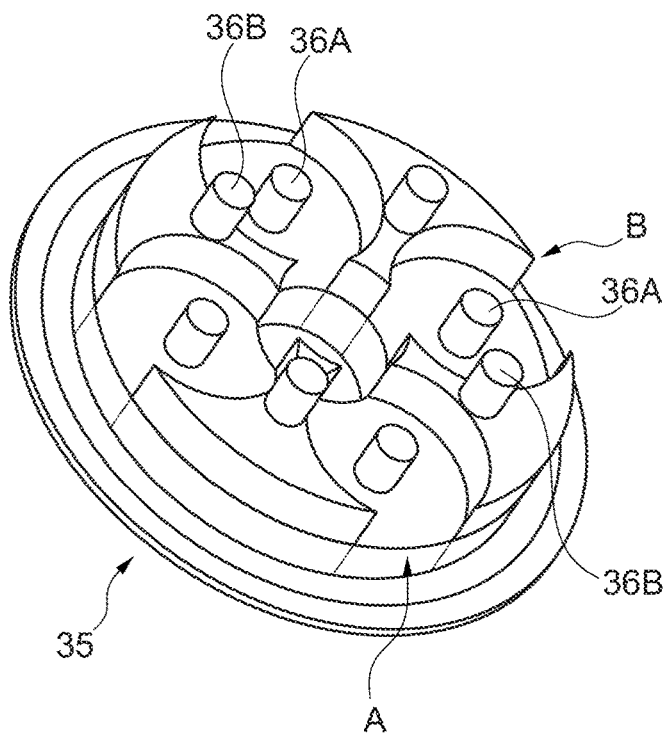
Fig. 3A
Fig. 3B
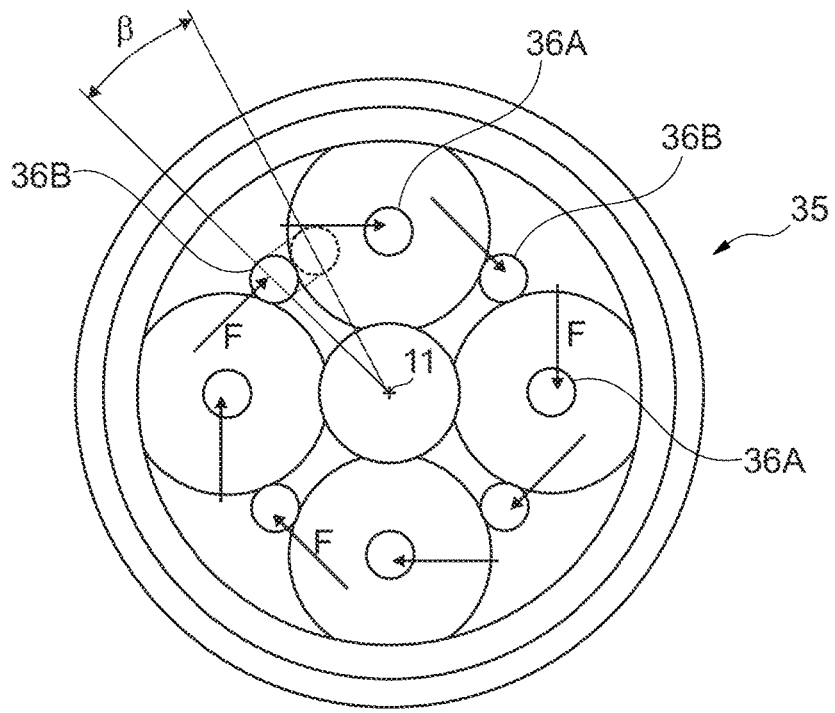
Fig. 3C

PLANETARY GEAR SYSTEM AND GAS TURBINE ENGINE WITH A PLANETARY GEAR SYSTEM

REFERENCE TO RELATED APPLICATION

This application claims priority to European Patent Application No. 17153747.5 filed on Jan. 30, 2017, the entirety of which is incorporated by reference herein.

BACKGROUND

The invention relates to a planetary gear system and a gas turbine engine with a planetary gear system.

Planetary gear systems are e.g. used in geared turbofan engines for aircrafts. The purpose of the planetary gear system in this exemplary application is the reduction of the rotational speed from a driving turbine to a propulsive fan stage. In this and other applications considerable mechanical loads are acting on the planetary gear system resulting in displacements of the planetary gears. One such system with two parallel rows of planetary gears is known from US 2016/0177841 A1.

SUMMARY

Therefore, planetary gear systems which can operation under high mechanical loads are required.

This is addressed by a planetary gear system for a gas turbine engine, in particular for an aircraft turbo engine with features as described herein.

The engine comprises a plurality of planetary gears coupled to a carrier device. The planetary gear system has front planetary gears mounted on pins in a front row and aft planetary gears mounted on pins in an aft row, the two rows being parallel to each other in the axial direction of the planetary gear system. The carrier device comprises a ring-like base structure around a rotational axis of the carrier device, which generally is the rotational axis of the gas turbine engine. The pins for the planetary gears are coupled to the carrier device through first and second extension elements for the positioning of the pins relative to the base structure. The second extension elements axially extending the respective pins further away from the base structure than the pins positioned by the first extension elements, so that the aft planetary gears are positioned in the aft row axially further away from the base structure than the front planetary gears in the front row The first extension elements, in particular arms as part of the first extension elements form first inclination angles $\alpha A$ against the base structure which are smaller than second inclination angles $\alpha B$ formed by the second extension elements, in particular arms as parts of the second extension elements. The ratio of the inclination angles $\alpha B/\alpha A$ being in the range of about $\alpha B/\alpha A=1, \ldots, 1.5$, in particular $\alpha B/\alpha A=1.25$. The different inclination angles allow an efficient positioning of the pins in the two parallel rows.

In an embodiment the base structure comprises extension elements radially extending inwards from the base structure.

In a further embodiment the extension elements are part of a support structure with a wave-like shape, the axial low points of the support structure relative to the base structure position the pins in the front row and the axial high points of the support structure relative to the base structure position the pins in the aft row. The wave-like shape is an efficient way to create pin positions in two parallel planes.

Furthermore, the extension elements and hence the pins can be positioned symmetrically around the rotational axis of the planetary gear system. In particular the pins are separated by an equal angle, in particular by 45°.

The extension elements can in some embodiments comprise linear arms and/or arc-shape arms extending radially inwards from the base structure. Using arms instead of solid blocks allows a lighter design of the support structure.

For a mechanical robust design the first extension elements can have section moduli WA which are lower than the section moduli WB of the second extension elements. In particular the ratio WB/WA can be in the range from 4 to 12, more particular in the range from 6 to 10, and more particular 8. This means that the parts of the support structure which are designed to be further away from the base structure have a stiffer design to account for higher mechanical loads.

Typically embodiments of the planetary gear system can comprise between three and six front planetary gears and between three and six aft planetary gears.

An effective design uses and embodiment in which the extension elements and/or the support structure are formed in one piece with the base structure.

In one embodiment the support structure has a band-like shape and the base structure has a flat, ring-like shape, the thickness of the support structure having in particular the same magnitude as the thickness of the base structure.

The issue is also addressed by a gas turbine engine with a planetary gear system as described herein.

BRIEF DESCRIPTION OF THE DRAWINGS

Embodiments of the invention are shown in the figures.

FIG. 3A shows a schematic side view of a base design of a carrier device for a double row planetary gear system.

FIG. 3B shows a schematic perspective view of the base design shown in FIG. 3A.

FIG. 3C shows a schematic frontal view of the base design shown in FIG. 3A.

DETAILED DESCRIPTION

Figure 1:
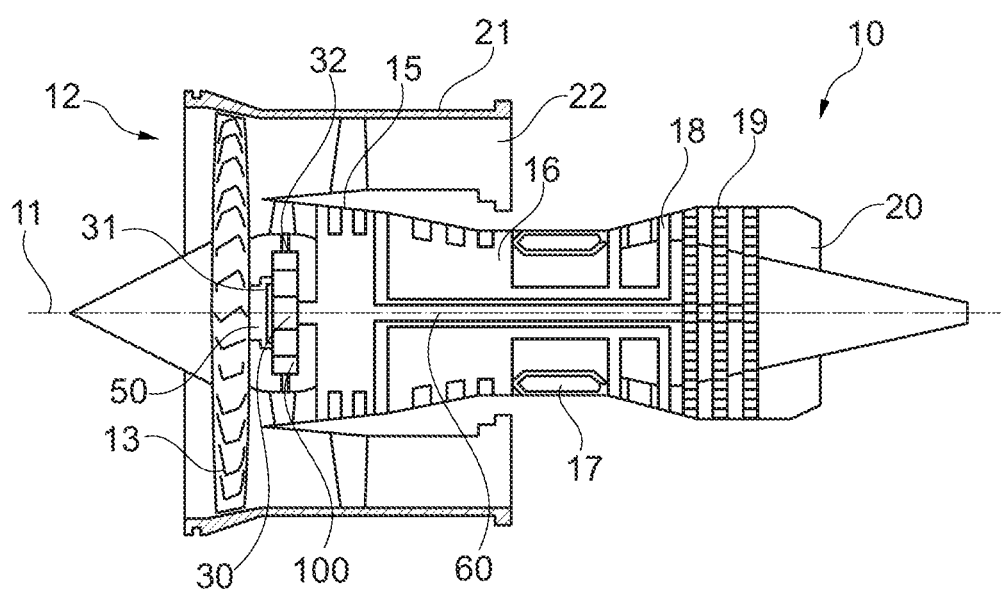
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13 (Here with a single stage. Other embodiments might have more than one stage,), a planetary gear system 100 (i.e. a gearbox), an intermediate pressure compressor 15, a high-pressure compressor 16, combustion equipment 17, a high-pressure turbine 18, an intermediate-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the propulsive fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft also drives the propulsive fan 13 via the planetary gear system 100. The planetary gear system 100 is a reduction gearbox in that it gears down the rate of rotation of the propulsive fan 13 by comparison with the intermediate pressure compressor 15 and intermediate pressure turbine 19.

The planetary gear system 100 in this embodiment is an epicyclic planetary gear system having a rotating ring gear 32, rotating and orbiting planet gears 31 supported by a planet carrier driven by a rotating sun gear 30. The planet gears 31 (see FIG. 2, 3, 4) are fixed relative to the sun gear 30.

The shaft driving the gear system 100 transmits torque to the sun gear 30. The centres of the planetary gears 31 are fixed, they rotate around themselves. The rotating ring gear 32 provides torque to the output side of the gear system 100.

The embodiment shown in FIG. 1 has a specific shaft arrangement which is understood not to be limiting. The embodiments described in the following can also work with a 2- or 3-shaft arrangement.

Figure 2:
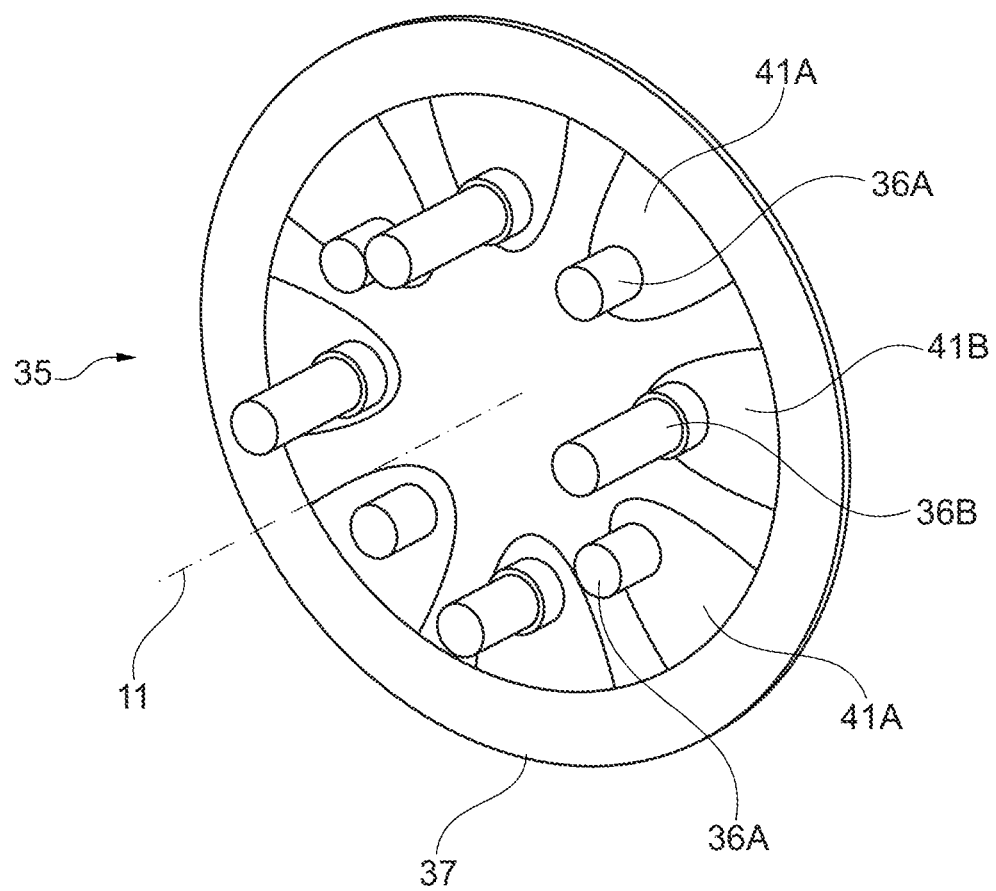
FIG. 2 shows a first embodiment of a carrier device of a double row planetary gear system.

FIG. 2 shows a perspective view of a first embodiment of a carrier device 35 for planetary gears 31 (not shown here) in a planetary gear system 100 with the rotational axis 11. The carrier device 35 comprises a base structure 37 in the form of a flat ring around the rotational axis 11. There are two sets of four pins 36A, 36B for mounting the eight planetary gears 31 in two star formations; the pins 36A, 36B are symmetrically positioned around the rotational axis 11. The pins are collinearly oriented in an axial direction.

The pins 36A, 36B are coupled to a base structure 37 of the carrier device 35 through extension elements 41A, 41B for the positioning of the pins 36A, 36B relative to the base structure 37. The extension elements 41A, 41B extend radially inwards from the base structure 37.

The planetary gears 31 are positioned in two axially parallel rows A, B of four planetary gears 31 each: the front planetary gears 31 in the front row A, the aft planetary gears 31 in the aft row B.

To achieve this, the second extension elements 41B axially extend the respective pins 36B in this embodiment further away from the base structure 37 than the pins 36A positioned by the first extension elements 41A. Therefore, the aft planetary gears 31 are positioned in the aft row B axially further away from the base structure 37 than the front planetary gears 31 in the front row A.

The relatively long pins 36B for the aft planetary gears 31 have wider base to position the aft planetary gears 31 in the aft row B. The shorter pins 36A position the front gears 31 in the front row A.

In FIGS. 3A, 3B, and 3C schematic views of a base design of a carrier device 35 for a planetary gear system 100 are shown, wherein the gear system 100 also comprises two parallel rows A, B of planetary gears 31 (not shown here). The views in FIGS. 3A, 3B, and 3C are shown to indicate the geometric relationships of the rows A, B for the planetary gears 31.

Each row A, B comprises four planetary gears 31 in a star formation around the rotational axis 11. The planetary gears 31 are mounted on pins 36A, 36B which are coupled to the carrier device 35. All pins 36A, 36B extend in a collinear, axial direction away from a base structure 37 of the carrier device 35. Both rows A, B in this embodiment are axially on the same side the base structure 37.

The pins 36B of the aft row B extend axially further away from the base structure 37 than the pins 36A of the first row A. Therefore, the two sets of four planetary gears 31 will operate in two separate, parallel rows A, B.

In the frontal view in FIG. 3C all eight pins 36A, 36B are shown with their respective loads, i.e. the forces F. The load is applied tangentially on the pins 36A, 36AB as shown in FIG. 3C. This also means that a tangential displacement angle β (see FIG. 3B in exaggeration) of the pins 36A, 36B extends in the tangential direction.

In an application for a gear system 100 in an aircraft turbo engine the forces F can be considerable, i.e. in the order of 100-300 kN on each pin, so that an even distribution of the forces F, and hence an even distribution of torque over the two rows A, B is important.

In this context it is also important, that the tangential displacement angles β of the pins 36A, 36B under loads F are kept small. In particular the relative tangential displacement between the two rows A, B should be minimized. This will be further discussed in connection with FIG. 7.

In FIGS. 4A, 4B, 4C, and 4D different views of second embodiment of a carrier device 35 for two rows of planetary gears 31 are shown. The planetary gears 31 themselves are not shown in these figures for the sake of simplicity.

The FIGS. 4A, 4B, 4C, and 4D are mainly intended to show the structural features of the carrier device 35 from different angles as indicated by the coordinate systems shown for each of the figures.

Figure 4A:
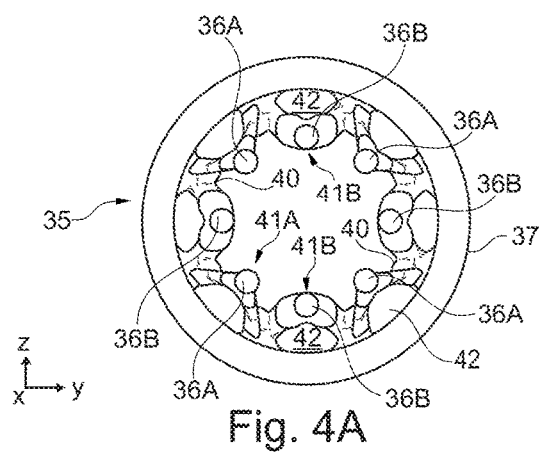
FIG. 4A shows a top view of a second embodiment of a carrier device for planetary gears.
Figure 4B:
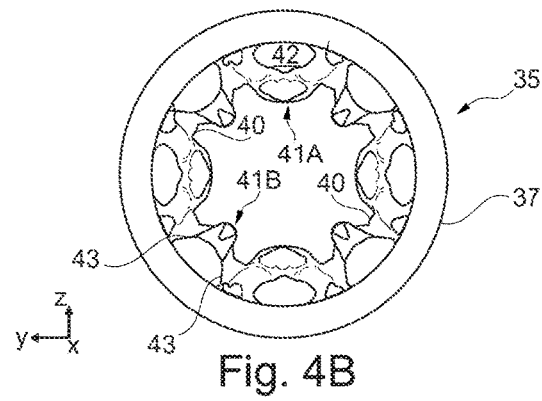
FIG. 4B shows a bottom view of the embodiment shown in FIG. 4A.
Figure 4C:
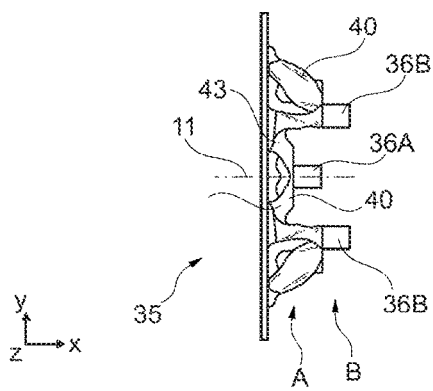
FIG. 4C shows a side view of the embodiment shown in FIG. 4A.
Figure 4D:
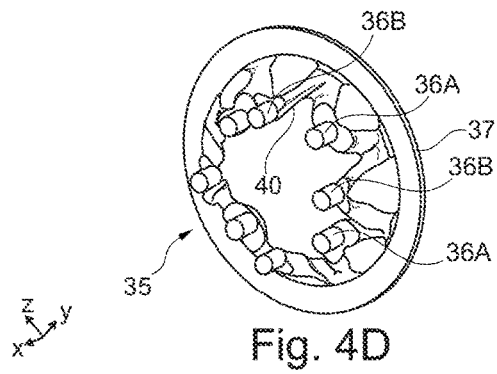
FIG. 4D shows a perspective view of the embodiment shown in FIG. 4A.

FIG. 4A shows a top view of the carrier device 35 which corresponds to the view shown in FIG. 3C, i.e. the eight pins 36A, 36B in both parallel rows A, B are visible. FIG. 4B shows a bottom view of the carrier device 35, so that the pins 36A, 36B are not visible. FIG. 4C shows a side view of the carrier device 35 so that the parallel rows A, B are visible, corresponding to the view shown in FIG. 3A. In this view it is best seen, that the pins 36A, 36B extend axially away in the same direction from the base structure 37. FIG. 4D shows a perspective view of the embodiment of the carrier device 35.

The embodiment comprises the base structure 37 in a form of a flat metal ring coupled with extension elements 41A, 41B for the pins 36A, 36B extending radially inwards and axially outwards. The extension element 41A, 41B are part of a support structure 40 with a wave-like shape. The low points of the support structure 40 measured axially relative to the base structure 37 position the pins 36A in the front row A. The high points of the support structure 40 measured axially relative to the base structure 37 position the pins 36B in the aft row B.

The support structure 40 comprises eight extension elements 41A, B pointing radially inwards (best seen in FIG. 4A) and axially away in x-direction (best seen in FIG. 4C) from the ring-like base structure 37. There is one extension element 41A, 41B for each pin 36A, 36B.

The extension elements 41A, 41B are part of a wave-shaped support structure 40. The extension elements 41A, 41B are formed from wave segments of the support structure 40 having roughly a triangular shape, i.e. the extension elements 41 have two arms 43 linking the apex to the ring-like base structure 37. The two arms 43 of the extension element 41A, 41B form in this embodiment an arc extending radially inwards and axially outwards. The apex of the arc (with the pins 36A, 36B) and the two connection points of the arms 43 with the base structure 37 form triangles. This is an example in which the extension elements 41A, 41B and the support structure 40 are both manufactured in one piece with the base structure 37.

The base of the triangles are at the ring-like base structure 37, the apex of the triangle is radially and axially pointing away from the base structure 37.

The base lines of the extension elements 41A, 41B are symmetrically positioned around the rotational axis 11 of the base structure 37, i.e. the base lines of the triangles are equal. Since the support structure 40 is formed here as a band-like structure formed together with the base structure 37, the extension elements 41A, 41B comprise holes 42 (here each shaped roughly elliptically) which reduces the weight of the carrier device 35.

In effect the support structure 40 forms a three-dimensional band-like and wave-like structure within the flat, ring-like base structure 37, the eight axial apexes of the wave being the location of the pins 36A, 36B. The wave form extends circumferentially around the inner circumference of the base structure 37 as e.g. seen in FIG. 4A and it extends axially away from the base structure 37 as e.g. seen in FIG. 4C or 4D.

To form the two parallel rows A, B, the essentially triangular extension elements 41A, B (abstracted from the wave segments) have sides with different inclination angles αA, αB.

Figure 5C:
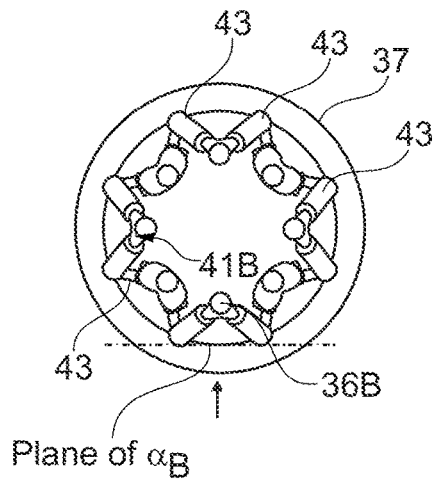
FIG. 5C shows a second view of a simplified model of the embodiment shown in FIG. 5A.
Figure 5B:
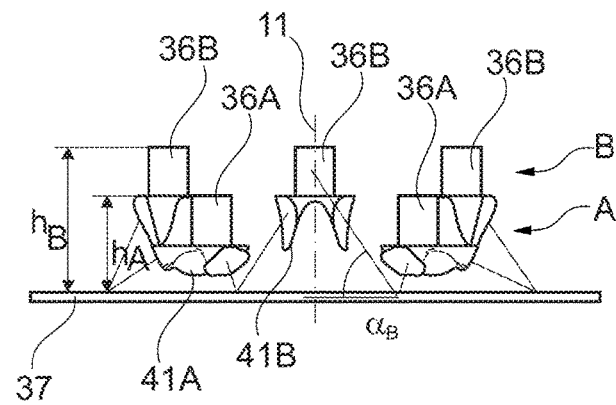
FIG. 5B shows a first view of a simplified model of the embodiment shown in FIG. 5A.
Figure 5A:
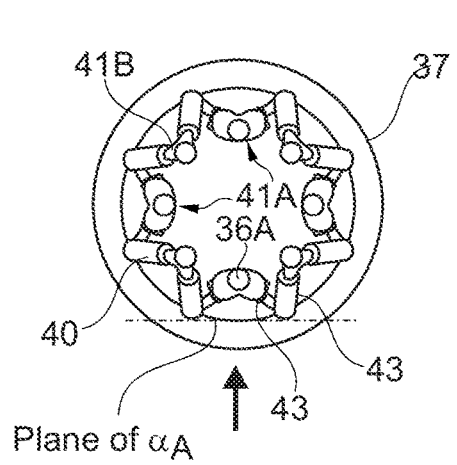
FIG. 5A shows a top view of a simplified model of the embodiment shown in FIG. 4A.
Figure 5D:
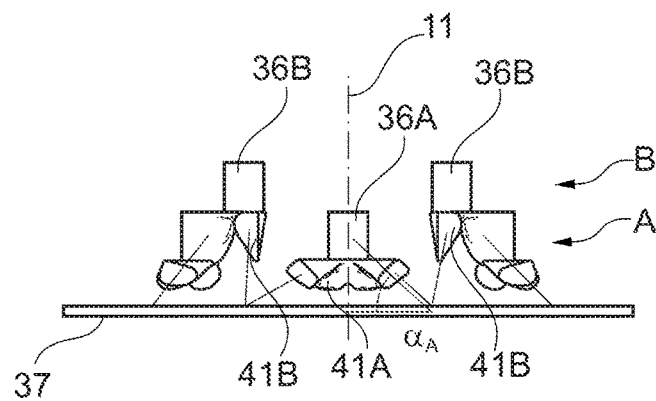
FIG. 5D shows a third view of a simplified side view of the embodiment shown in FIG. 5A.

This is shown schematically in FIGS. 5A, 5B, 5C, and 5D. FIGS. 5A and 5C show identical top views of the embodiment of FIG. 4, the view in FIG. 5C being rotated by 45° from the view on FIG. 5A. FIGS. 5B and 5D show respective side views of FIG. 5C and FIG. 5A, the direction of view indicated by an arrow in FIGS. 5A and 5C.

In FIGS. 5A, 5B, 5C, and 5C the support structure 40 with the extension elements 41A, 41B is represented as a simplified structure of the embodiment shown in FIGS. 4A, 4B, 4C, and 4D highlighting the essentially triangular shape of the wave segments, i.e. the extension elements 41A, 41B. In the side views of FIGS. 5B and 5D the different heights hA, hB of the extension elements 41A, 41B above the base structure are due to the different inclination angles αA, αB. The inclination angles αA, αB are measured between the plane of the base structure 37 and a projection of the extension elements 41A, 41B through the centers of the pins 36A, 36B in radial directions on the plane of the drawings FIGS. 5B and 5D.

The extension elements 41A of the front row A have smaller inclination angle αA (see FIG. 5D) than the inclination angle αB of the extension elements 41B of the aft row B (see FIG. 5B).

This allows to position the pins 36A, 36B evenly spaced on a circle within the base structure 37 but axially on two different planes, i.e. the pins 36A, 36B can be located in parallel rows A, B.

As seen e.g. in the top views of FIG. 4A or 5A all eight pins 36A, 36B are spaced 45° apart. The four pins 36A in the front row A, and the four pins 36B in the aft row B are spaced 90° apart. All eight pins 36A, 36B are positioned on a circle within the ring-like base structure 37.

This band-like and wave-like support structure 40 allows a stiff and light-weight design of the carrier device 35.

In an alternative embodiment, the support structure 40 is not band- or wave-like as described above but comprises extension elements 41A, 41B comprise more linear, stick-like elements.

Figure 6A:
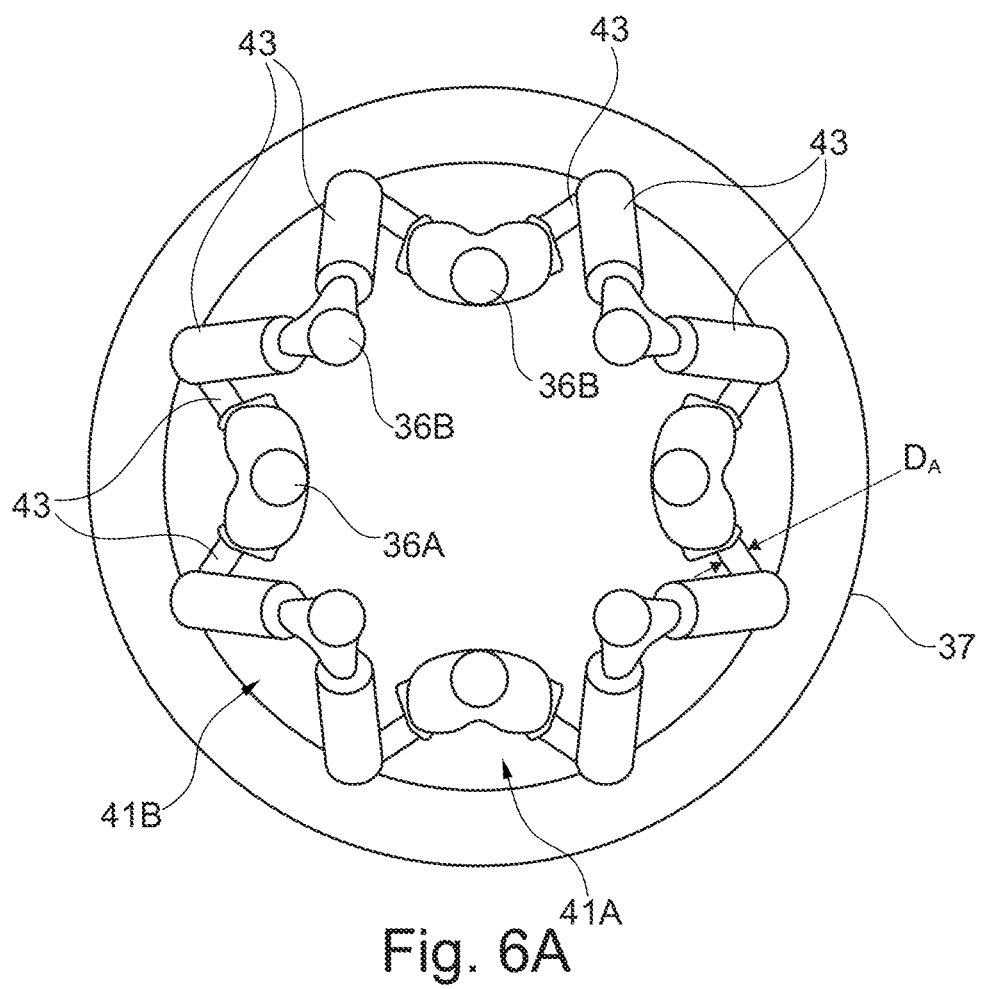
FIG. 6A shows a top view of third embodiment of a carrier device.
Figure 6B:
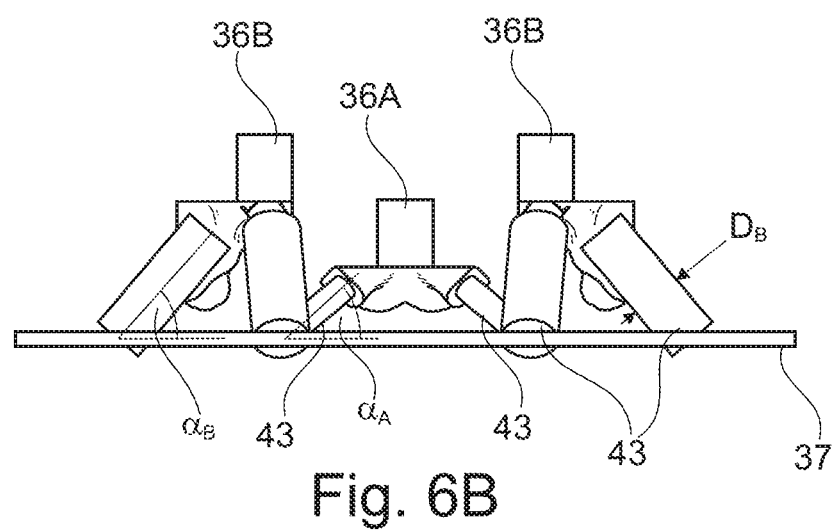
FIG. 6B shows a side view of the embodiment shown in FIG. 6A.

Such a third embodiment is shown in FIGS. 6A and 6B. Here the essentially triangular shape of the extension elements 41A, 41B can be better seen as in the band- and wave-like support structure 37 in the embodiment described above.

The extension elements 41A, 41B in the third embodiment comprise two linear arms 43 each. As in the previously shown embodiment, the inclination angles αA of the extension elements 41A of the front row A are smaller than the inclination angles αB of the extension elements 41B of the aft row B.

As mentioned above, one aspect of the invention is to minimize the tangential displacement angle β (see e.g. FIG. 3C of the pins 36A, 36B, in particular the relative tangential displacement between pins 36A, 36B in different the rows A, B.

The tangential displacement angle β depends inter alia on the section modulus WA, WB of the support structure 40 for the pins 36A, 36B. In the embodiments shown above, the section moduli WA for the extension elements 41A for the pins 36A in the front row A are smaller than the section moduli WB for the extension elements 41B of the pins 36B in the aft row B.

The section moduli $W_A$, $W_B$ of the extension elements 41A, 41B for the embodiment according to FIG. 6A, 6B can be approximated as round beams with diameters $D_A$, $D_B$:

$$W_A = \frac{\pi D_A^3}{32}$$

$$W_B = \frac{\pi D_B^3}{32}.$$

Ratios of $W_B/W_A$ in the range of 4 to 12, in particular in the range between 6 and 10 can be used.

In the following $W_B/W_A=8$ is assumed. This means that the extension elements 41A, i.e. the arms 43 forming the triangle for the front row A can have a diameter of $D_A=40$ mm and the arms of the extension elements 41B for the aft row B can have a diameter $D_B=80$ mm.

As mentioned above the maximal relative tangential displacement variation PV between pins 36A, 36B in the two parallel rows is important.

In the context of the embodiments described above the relative tangential displacement for a pin 36A i in the front row A (i=1, . . . , 4) against a pin 36B in the aft row (i=5, . . . , 8) can be defined as follows:

$$PV_j=(u_i-u_{i+4})/u_i$$

With u being the tangential linear displacement of the pins 36A, 36B due to the tangentially operating forces F (see FIG. 3C).

Figure 7:
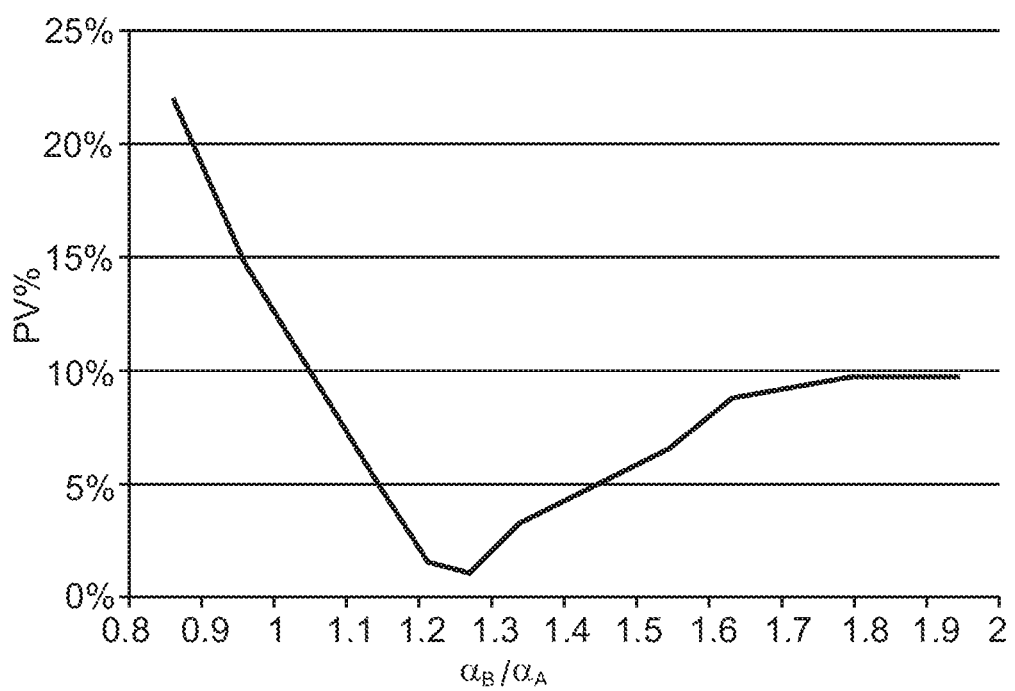
FIG. 7 showing the dependence of the tangential displacement of a planetary gear pin on the geometry of the support structure for the planetary gear pin.

The percentwise variation of the tangential displacement is shown in FIG. 7 in dependence of the ratio of the inclination angles ($\alpha_B/\alpha_A$). The optimal value for the tangential displacement lies around $\alpha_B/\alpha_A$=1.25, i.e. the inclination angle $\alpha_B$ for the aft row B is about 25% larger than the inclination angle $\alpha_A$ for the front row A. Good results can be obtained in range of about $\alpha_B/\alpha_A$=1, . . . , 1.5.

LIST OF REFERENCE NUMBERS 10 gas turbine engine
11 principal rotational axis
12 air intake
13 propulsive fan
15 intermediate pressure compressor
16 high-pressure compressor
17 combustion equipment
18 high-pressure turbine
19 intermediate-pressure turbine
20 exhaust nozzle
21 fan casing
22 by-pass duct
30 sun gear
31 planet gears
32 ring gear
35 carrier device for planetary gears
36A pin for front planetary gear in the front row
36B pin for aft planetary gear in the aft row
37 base structure of carrier device
40 support structure for pin
41A first extension element for pin in the front row
41B second extension element for pin in the aft row
42 hole
43 arm of an extension element
100 gear system
A front row of planetary gears
B aft row of planetary gears
$D_A$ diameter of beam in extension element for front row
$D_B$ diameter of beam in extension element for aft row
F force on pin
$h_A$ height of pin in front row
$h_B$ height of pin in aft row
PV Percentage Variation of tangential displacement between the couple of the PINs
$W_A$ section modulus of extension element for front row
$W_B$ section modulus of extension element for aft row
$\alpha_A$ inclination angle of extension element for pin in the front row
$\alpha_B$ inclination angle of extension element for pin in the aft row
$\beta$ tangential displacement angle of pin

The invention claimed is:

1. A planetary gear system for a gas turbine engine comprising:
   a carrier device;
   front pins and aft pins;
   a plurality of planetary gears coupled to the carrier device, the plurality of planetary gears including front planetary gears mounted on the front pins in a front row and aft planetary gears mounted on the aft pins in an aft row, the front and aft rows being parallel to each other in an axial direction of the planetary gear system,
   the carrier device including a ring-shaped base structure around a rotational axis of the carrier device,
   first extension elements coupling the front pins to the carrier device for positioning the front pins relative to the base structure
   second extension elements coupling the aft pins to the carrier device for positioning the aft pins relative to the base structure,
   the second extension elements axially extending the aft pins further away from the base structure than the front pins positioned by the first extension elements, so that the aft planetary gears are positioned in the aft row axially further away from the base structure than the front planetary gears in the front row, and
   the first extension elements form first inclination angles $\alpha_A$ against the base structure which are smaller than second inclination angles $\alpha_B$ formed by the second extension elements, with a ratio of the second and first inclination angles $\alpha_B/\alpha_A$ being in a range of $\alpha_B/\alpha_A$=1 to 1.5.

2. The planetary gear system according to claim 1, wherein the first and second extension elements extend radially inwards from the base structure.

3. The planetary gear system according to claim 1, wherein
   the first and second extension elements from of a support structure with a wave shape,
   axial low points of the support structure relative to the base structure position the aft pins in the front row, and
   axial high points of the support structure relative to the base structure position the aft pins in the aft row.

4. The planetary gear system according to claim 1, wherein the first and second extension elements and the front and aft pins are positioned symmetrically around the rotational axis of the planetary gear system.

5. The planetary gear system according to claim 1, wherein the front and aft pins are separated by an equal angle.

6. The planetary gear system according to claim 5, wherein the front and aft pins are separated by an angle of 45°.

7. The planetary gear system according to claim 1, wherein arms of the first extension elements form the first inclination angles $\alpha_A$ against the base structure which are smaller than the second inclination angles $\alpha_B$ formed by arms of the second extension elements.

8. The planetary gear system according to claim 1, wherein the ratio of the inclination angles $\alpha_B/\alpha_A$ being $\alpha_B/\alpha_A$=1.25.

9. The planetary gear system according to claim 1, wherein the first and second extension elements comprise at least one chosen from linear arms and arc-shape arms extending radially inwards from the base structure.

10. The planetary gear system according to claim 1, wherein the first extension elements have section moduli $W_A$ which are lower than section moduli $W_B$ of the second extension elements.

11. The planetary gear system according to claim 10, wherein a ratio of the section moduli $W_B/W_A$ is in a range of 4 to 12.

12. The planetary gear system according to claim 11, wherein the ratio of the section moduli $W_B/W_A$ is 8.

13. The planetary gear system according to claim 1, comprising between three and six front planetary gears and between three and six aft planetary gears.

14. The planetary gear system according to claim 3, wherein at least one chosen from the extension elements and the support structure are formed in one piece with the base structure.

15. The planetary gear system according to claim 3, wherein the support structure has a band shape.

16. The planetary gear system according to claim 15, wherein a thickness of the support structure has a same magnitude as a thickness of the base structure.

17. The planetary gear system according to claim 1, wherein the gas turbine engine is an aircraft turbo engine.

18. A gas turbine engine with a planetary gear system according to claim 1.

* * * * *